(12) United States Patent
Schulz

(10) Patent No.: US 12,464,405 B2
(45) Date of Patent: Nov. 4, 2025

(54) ORCHESTRATING NETWORK USAGE UNDER THE THREAT OF UNEXPECTED BANDWIDTH SHORTAGES

(71) Applicant: ABB Schweiz AG, Baden (CH)

(72) Inventor: Dirk Schulz, Meckenheim (DE)

(73) Assignee: ABB Schweiz AG, Baden (CH)

( * ) Notice: Subject to any disclaimer, the term of this patent is extended or adjusted under 35 U.S.C. 154(b) by 420 days.

(21) Appl. No.: 18/080,837

(22) Filed: Dec. 14, 2022

(65) Prior Publication Data
US 2023/0189060 A1     Jun. 15, 2023

(30) Foreign Application Priority Data

Dec. 15, 2021 (EP) .................................. 21214588

(51) Int. Cl.
*H04W 28/02*       (2009.01)
*H04W 28/08*       (2023.01)
(Continued)

(52) U.S. Cl.
CPC ... *H04W 28/0289* (2013.01); *H04W 28/0983* (2020.05); *H04W 28/0992* (2020.05); *H04W 48/06* (2013.01); *H04W 88/18* (2013.01)

(58) Field of Classification Search
CPC ......... H04W 28/0289; H04W 28/0983; H04W 28/0992; H04W 48/06; H04W 88/18;
(Continued)

(56) References Cited

U.S. PATENT DOCUMENTS 6,252,848 B1 *   6/2001   Skirmont ............ H04L 47/2441
                                                           714/26
7,701,949 B1 *   4/2010   Rose .................... H04L 47/245
                                                           370/395.42
(Continued)

FOREIGN PATENT DOCUMENTS

CN          104219174 A      12/2014
CN          105871755 A       8/2016
(Continued)

OTHER PUBLICATIONS

European Patent Office, Extended European Search Report in European Patent Application No. 21214588.2, 13 pp. (Jun. 7, 2022).
(Continued)

*Primary Examiner* — Mohamed A Kamara
(74) *Attorney, Agent, or Firm* — Leydig, Voit & Mayer, Ltd.

(57) ABSTRACT

A method for orchestrating use of a communications network for conveying a plurality of data streams transmitted by a plurality of applications includes attributing levels of importance to individual or groups of data streams, determining based at least in part on the levels of importance and on network capacity requirements of the data streams an ordered list of data streams to be curtailed or stopped in case of a shortage of bandwidth in the communications network, providing the list to a management entity that monitors available bandwidth, compares available bandwidth to a combined bandwidth requirement and, in response to determining that the available bandwidth is, or is imminent to become, less than the combined bandwidth requirement, curtails or stops data streams in the order given by the list so as to bring the combined bandwidth requirement back to or below the available bandwidth.

13 Claims, 2 Drawing Sheets

(51) Int. Cl.
*H04W 48/06* (2009.01)
*H04W 88/18* (2009.01)

(58) Field of Classification Search
CPC . H04W 28/0268; H04W 28/10; H04W 28/20; H04L 47/20; H04L 47/22; H04L 47/24; H04L 47/2416; H04L 47/2433; H04L 47/2441; H04L 47/2475; H04L 41/0896; H04L 47/52; H04L 47/76
See application file for complete search history.

(56) References Cited

U.S. PATENT DOCUMENTS

| | | | |
|---|---|---|---|
| 8,239,534 B1 | 8/2012 | Fall et al. | |
| 2007/0076604 A1* | 4/2007 | Litwack | H04L 47/33 370/230 |
| 2012/0213078 A1* | 8/2012 | Kitada | H04L 47/17 370/236 |
| 2012/0254936 A1* | 10/2012 | Baek | H04L 47/20 726/1 |
| 2016/0227434 A1* | 8/2016 | Grinshpun | H04W 28/0231 |
| 2017/0244606 A1 | 8/2017 | Htay | |
| 2021/0385137 A1* | 12/2021 | Sridhar | H04L 47/2433 |
| 2022/0231939 A1* | 7/2022 | Mermoud | H04L 41/5025 |
| 2022/0353195 A1* | 11/2022 | Wei | H04L 41/122 |

FOREIGN PATENT DOCUMENTS

| | | |
|---|---|---|
| CN | 106716939 A | 5/2017 |
| WO | WO 2014/173466 A1 | 10/2014 |
| WO | WO 2018/095507 A1 | 5/2018 |
| WO | WO 2021/063515 A1 | 4/2021 |

OTHER PUBLICATIONS

China National Intellectual Property Administration, Office Action in Chinese Patent Application No. 202211609041.1, 10 pp. (Jun. 18, 2025).

* cited by examiner

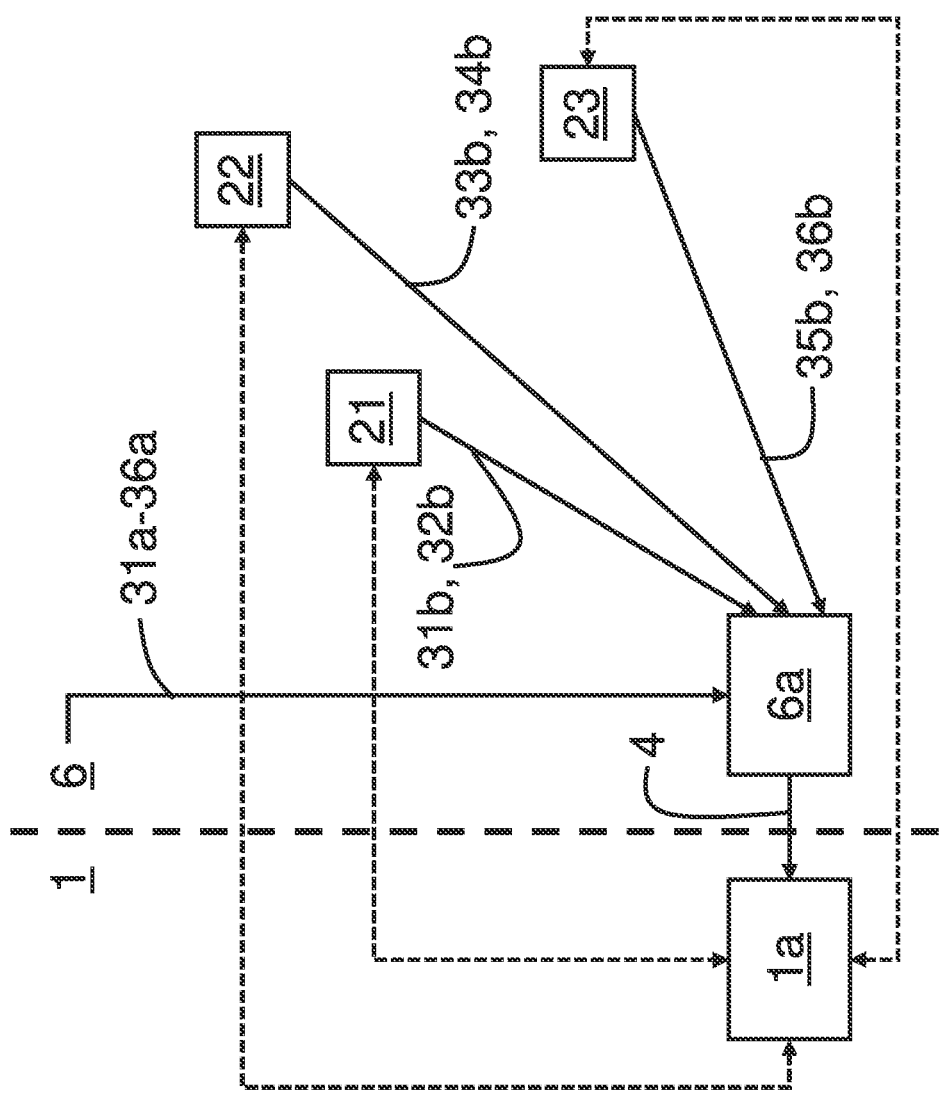

ORCHESTRATING NETWORK USAGE UNDER THE THREAT OF UNEXPECTED BANDWIDTH SHORTAGES

CROSS-REFERENCE TO RELATED APPLICATIONS

This patent application claims priority to European Patent Application No. 21214588.2, filed on Dec. 15, 2021, which is incorporated herein in its entirety by reference.

FIELD OF THE DISCLOSURE

The present disclosure relates to the field of orchestrating network communications in industrial plants.

BACKGROUND OF THE INVENTION

Operating a complex industrial plant, and/or executing an industrial process on such a plant, is dependent on many data streams that need to be conveyed across the plant. For example, a distributed control system, DCS, needs to issue control actions to low-level controllers and actuators in the plant, and needs to read out process variables as feedback for control loops.

Because these data streams may be critical for the safe and reliable operation of the plant, wired networks have previously been preferred over wireless networks due to their higher reliability. However, it is desirable to exploit the growing potential of wireless networks also for critical communication of industrial plants.

WO 2018/095 507 A1 discloses a method for scheduling communication of field devices in a wireless network of an industrial process system.

BRIEF SUMMARY OF THE INVENTION

In a general aspect, the present disclosure describes systems and methods that improve the reliability of communication in an industrial setting, where a more diverse spectrum of applications needs to transmit critical data streams over a wireless network.

In a more particular aspect, the present disclosure describes a method for orchestrating the use of at least one communications network for conveying a plurality of data streams transmitted by a plurality of applications. The network may be a wired network or a wireless network. The goal of the method is to orchestrate the use of the network in case of an unexpected shortage of bandwidth.

Wireless networks tend to be more prone to such unexpected shortages for several reasons. The most important reason lies is the nature of the radio communication medium as opposed to a cable or wire. Generally, the particular channel capacity between communication partners depends on the physical environment, including distance, obstructions, reflections, and other factors down to air humidity. For some technologies, the radio frequency spectrum also is a medium that the operator of the industrial plant must share with other entities. In particular, unlicensed spectrum, such as WiFi, tends to be crowded especially in urban areas. In addition, 5 GHz WiFi has to cease transmitting and change frequency as soon as an attempt by a primary user (such as radar) to use the channel is detected. Network Slicing in a 5G network logically separates a public 5G network into multiple logical networks for exclusive use by their owners, but the physical infrastructure still has to be shared with other users. Even private 5G networks are not completely immune to unexpected bandwidth shortages because the spectrum may be impaired by faulty devices of third parties or even by intentional radio interference (jamming).

In the course of the method, levels of importance are attributed to individual data streams, and/or to groups of data streams. Based at least in part on these levels of importance and on network capacity requirements of the data streams, an ordered list of data streams to be curtailed or stopped in case of a shortage of bandwidth in the communications network is determined. Herein, network capacity requirements may be formulated in terms of any suitable quantity, such as one or more of: bandwidth, latency, reliability, and a level of redundancy. In particular, the ordered list may specify concrete actions that are to be taken to curtail and/or stop data streams, such as "scale down the resolution of a video data stream" or "convert a video data stream to black and white". The ordered list is provided to a network management entity. The management entity is configured to:
  monitor the available bandwidth in the communications network;
  compare the available bandwidth to a combined bandwidth requirement of all data streams currently being transmitted; and
  in response to determining that the available bandwidth is, or is imminent to become, less than the combined bandwidth requirement, curtail or stop data streams in the order given by the list, so as to bring the combined bandwidth requirement back to or below the available bandwidth.

BRIEF DESCRIPTION OF THE SEVERAL VIEWS OF THE DRAWING(S)

FIG. 2 is a diagram for a use case of the method shown in FIG. 1 in the context of an industrial plant, in accordance with the disclosure.

DETAILED DESCRIPTION OF THE INVENTION

Figure 1:
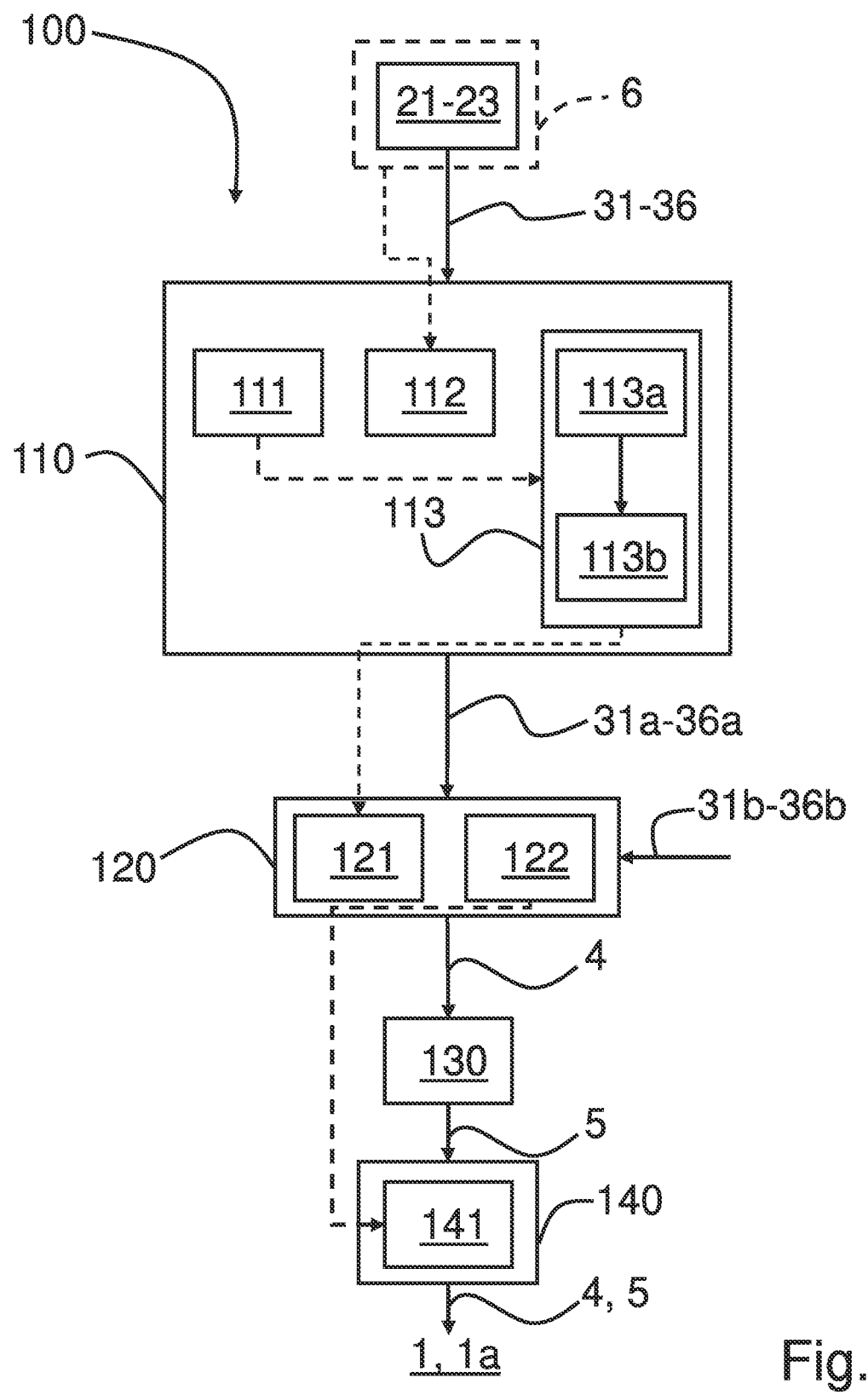
FIG. 1 is a flowchart for a method for orchestrating the use of a network by data streams from applications in accordance with the disclosure.

FIG. 1 is a schematic flow chart of an embodiment of the method 100 for orchestrating the use of a network 1 by data streams 31-36. The data streams 31-36 are transmitted by different applications 21-23.

In step 110, each individual data stream 31-36 is assigned a level 31a-36a of importance. As discussed before, this can be made much more granular than previous QoS information. In particular, the levels 31a-36a of importance may be motivated by the concrete applications 21-23, so they may greatly differ even between data streams 31-36 that, by virtue of their similar technical structure (such as video streams or control traffic), have same or similar QoS information.

In step 120, based at least in part on the levels 31a-36a of importance and on bandwidth requirements 31b-36b of the data streams 31-36, an ordered list 4 of data streams 31-36 to be curtailed or stopped in case of a shortage of bandwidth in the communications network 1 is determined.

In step 130, as a counterpart to this ordered list 4, based at least in part on the levels 31a-36a of importance and on network capacity requirements 31b-36b of the data streams 31-36, a second ordered list 5 of data streams 31-36 indicating the order in which data streams 31-36 are to be un-curtailed or re-started is established.

In step 140, both ordered lists 4 and 5 are provided to a network management entity 1*a* of the communications network 1. This network management entity 1*a* is configured to:
- monitor the available bandwidth in the communications network 1;
- compare the available bandwidth to a combined bandwidth requirement of all data streams 31-36 currently being transmitted;
- in response to determining that the available bandwidth is, or is imminent to become, less than the combined bandwidth requirement, curtail or stop data streams 31-36 in the order given by the list 4, so as to bring the combined bandwidth requirement back to or below the available bandwidth; and
- in response to determining that the available bandwidth is higher than the combined bandwidth requirement, and at least one data stream 31-36 is curtailed or stopped: un-curtailing or re-starting at least one curtailed or stopped data stream 31-36.

According to block 111, any data stream 31-36 may be classified as: a non-negotiable data stream 31-36 that is not to be curtailed or stopped; a scalable data stream 31-36 that may be curtailed up to a given extent; or a best-effort data stream 31-36 that may be stopped.

In particular, the applications 21-23 transmitting the data streams 31-36 may participate in the operation of an industrial plant 6, and/or in the execution of at least one production process on this industrial plant 6. According to block 112, the levels 31-36 of importance may then be attributed to data streams 31-36, and/or groups of data streams 31-36, based at least in part on the importance of these data streams 31-36 for the operation of the plant 6, and/or for the execution of the process.

According to block 113, at least one data stream 31-36 may comprise measurement values of a process quantity. According to block 121, the curtailing of this data stream may then comprise extending the interval at which new measurement values of the process quantity are transmitted.

In particular, according to block 113*a*, at least one data stream 31-36 with measurement values of a first process quantity may be classified as a non-negotiable data stream, whereas, according to block 113*b*, at least one data stream 31-36 with measurement values of a second process quantity is classified as a scalable data stream. The difference between the data streams is that the first process quantity, such as a pressure, varies on a faster time scale than the second process quantity, such as a temperature.

According to block 122, the determining 120 of the ordered list 4 of data streams 31-36 to be curtailed or stopped may be negotiated 122 between multiple entities in a consensus manner. According to block 141, the result of this negotiation may then be provided to the network management entity 1*a*.

FIG. 2 illustrates an exemplary use case of the method 100 in an industrial plant 6. On the side of the industrial plant 6, a plant management entity 6*a* gathers knowledge from the plant 6 as to which data streams 31-36 are of which respective importances 31*a*-36*a*. That is, the importances 31*a*-36*a* are derived from knowledge about the domain of the plant. In the example shown in FIG. 2, the applications themselves inform the plant management entity about the respective network capacity requirements 31*b*-36*b* of the data streams 31-36 they need to send across the network 1.

From the network capacity requirements 31*b*-36*b* in combination with the importances 31*a*-36*a*, an ordered list 4 of data streams 31-36 that are to be curtailed or stopped in case of a shortage of bandwidth in the communications network 1 is determined. This list 4 may have entries of the kind, "scale this video data stream down from UHD to FHD to save 6 Mbit/s", and "stop that video stream altogether to save 15 Mbit/s". It is communicated to the network management entity 1*a*. The network management entity 1*a* may then interact with the applications 21-23, and/or with any suitable network devices in the network 1 (not shown in FIG. 2), to enact the curtailing and/or stopping of data streams if the need arises.

Previously, data streams could carry individual Quality of Service, QoS, information on the priority, latency or bandwidth requirement. When handling multiple data streams with different QoS information, one data stream may be prioritized over the other based on the QoS information. But the QoS information is not able to accommodate any additional knowledge as to how important each data stream is for the concrete domain of application. For example, all video data streams or all control data streams carry the same QoS information because they are technically the same and differ only by their content. But different content may give rise to different importances with respect to operation of an industrial plant as a whole. For example, a video data stream that monitors the actual execution of a process on the industrial plant is much more important than a video data stream that monitors the parking lot of the plant. The new, much more granular assignment of levels of importance allows to globally pitch individual data streams of the same priority against each other.

This information may then be exploited to produce, in the form of the ordered list, a clear degradation response plan. For every level of network capacity, the network manager knows how to degrade the integrity level of which data stream and which application. Likewise, on the side of the plant operator, it is known in advance which degradations to expect in which order in case of a shortage of bandwidth.

In the toy example of a professional drone that is being flown in the plant, the link between the remote controller and the drone may be used for conveying video streams captured by the drone in multiple directions in the downlink to the remote controller, and a control data stream in the uplink to the drone. Of course, to keep control of the drone, it is important to maintain the control data stream. But at least a video data stream that captures what is ahead of the drone in the current direction of flight is just as important if the drone is being flown out of direct visual range of the pilot. Without this video data stream, the pilot is flying blind, and the risk of collision is increased. So it is advantageous to keep at least this video data stream and the control traffic, and sacrifice the video feed from directions in which the drone is not currently flying.

In a particularly advantageous embodiment, the ordered list contains at least a first entry and a second, later entry affecting a same data stream, wherein the first entry indicates that the data stream is to be curtailed, and the second entry indicates that the data stream is to be curtailed even further or stopped. In this manner, the degradation of service may be made even more granular and graceful. For example, the ordered list may specify that the video is first scaled down in resolution, then it is downgraded from color to black and white, and then the frame rate is decreased, before the video data stream finally fails altogether.

In a further particularly advantageous embodiment, the network management entity is further configured to: in response to determining that the available bandwidth is higher than the combined bandwidth requirement, and at least one data stream is curtailed or stopped: un-curtailing or re-starting at least one curtailed or stopped data stream. That is, once the bandwidth shortage is remedied, the full service gradually returns. Most unexpected bandwidth shortages are only temporary, i.e., they disappear again as quickly as they had come. If a choice is to be made between multiple curtailed or stopped data stream, this choice may be made according to any suitable strategy. For example, the service that was last curtailed or stopped may be the first candidate for getting un-curtailed or re-started. This will restore more important data streams earlier. Another possible strategy is to choose the service that was first curtailed or stopped as the first candidate for getting un-curtailed or re-started. This will restore the data streams that have been affected for the longest time. For example, this may avoid timeouts of transmissions in applications.

To aid this, in a further advantageous embodiment, based at least in part on the levels of importance and on network capacity requirements of the data streams, a second ordered list of data streams is determined. This second ordered list indicates the order in which data streams are to be un-curtailed or re-started. In this manner, it may be accommodated that operation of a plant, and/or execution of a process, may benefit more if services return in a different order than that in which they were curtailed and/or stopped.

Any suitable "ordering indicators" may be used to compile the ordered list of resource (de-)allocations. For example, a general policy may stipulate that applications are first scaled down in priority order before stopping them in priority order. For example, video surveillance may have lower priority than process condition monitoring and is reduced in resolution first. But condition monitoring may be also first scaled down if possible before the video is stopped altogether. Such a general policy may be augmented and/or superseded by a specific policy that may put different key performance indicators, KPIs, into a concrete order, which may be optionally combined with application or signal priorities. In this manner, a concrete allocation order for connection sets, such as individual connections, parts of applications, one or multiple applications, or any other partitioning.

Curtailing and/or stopping of one or more data streams may advantageously be combined with the un-curtailing and/or re-starting of other data streams. For example, if some data streams relating to condition monitoring have been stopped first, and then a further large chunk of bandwidth has been freed by scaling process critical video from UHD down to FHD, then at the time this chunk is freed, it may be larger than the current shortfall in bandwidth. That is, after this chunk has been freed, some bandwidth may actually be left over. In this case, the data streams relating to the condition monitoring that had previously been stopped may be re-started in order to utilize the excess bandwidth that has now become available by freeing the large chunk of bandwidth.

The curtailing or stopping of at least one data stream may be performed in any suitable manner. For example, resources that were previously foreseen for use by the data stream may be deallocated on the network side. At least one network infrastructure device may be instructed to throttle bandwidth usage of the data stream, or to block forwarding of the data stream. Also, at least one network infrastructure device may be instructed to compress and/or transcode the data stream. In particular, this may free up part of the bandwidth that is taken up by video data streams.

Alternatively or in combination to this, a source of the data stream may be instructed to curtail bandwidth usage of the data stream, or to stop the data stream. The source is closer to the actual application and may therefore have more information as to which part of the information in the data stream is more dispensable than other parts of this information. For example, in some kinds of video, color information may be more important, and in other kinds of video, the pixel resolution or the frame rate may be more important.

In a further particularly advantageous embodiment, the attributing of importances to data streams may comprise classifying at least one data stream as: a non-negotiable data stream that is not to be curtailed or stopped; a scalable data stream that may be curtailed up to a given extent; or a best-effort data stream that may be stopped. These are the main categories of data streams that are relevant during the execution of industrial processes on industrial plants.

Thus, in a further particularly advantageous embodiment, the applications transmitting the data streams participate in the operation of an industrial plant, and/or in the execution of at least one production process on this industrial plant, and the levels of importance are attributed to data streams, and/or groups of data streams, based at least in part on the importance of these data streams for the operation of the plant, and/or for the execution of the process. In this manner, knowledge about the domain of the process may be transferred into the plan for graceful degradation in case of a shortage of bandwidth. In essence, such domain knowledge determines what exactly is to be regarded as "graceful". Examples of data streams that are relevant for production processes in industrial plants include I/O signals, such as measurement values, status information, condition data, actuation data or other traffic that is exchanged within a distributed control system (DCS). But relevant data streams may also, for example, include video data streams, whether they are automatically evaluated by machine (e.g., for the purposes of a DCS) or not.

In one particularly advantageous embodiment, at least one data stream comprises a critical video data stream that is, at least in a degraded form, required for continuing operation of the plant, and/or execution of the process. Most of the time, multiple video data streams are being conveyed in an industrial plants, but only few of them are this important. It is then advantageous not to treat all video data streams equally (as per the QoS framework), but to focus the bandwidth on the video data stream that matters the most for execution of the process.

In particular, the critical video data stream may be classified either as a non-negotiable data stream or as a scalable data stream. This ensures that the critical video data stream is always transmitted at least in a degraded form. By contrast, if the critical video data stream was classified as a best-effort data stream, it might be stopped altogether. This would be contrary to the requirement that it is always transmitted at least in a degraded form.

In one example, the critical video data stream is a live video stream that monitors the execution of the process or is analyzed to assess quality or quality issues of the manufactured product. For example, in a waste incineration plant, the video data stream may monitor the combustion. In a chemical production process, the video data stream may monitor a reaction vessel for signs that the process is about to get out of control. For example, such signs may include a change of color or the forming of bubbles or foam in the contents of the reaction vessel.

In principle, control traffic belongs to the most important traffic for the execution of a process in an industrial plant. This important control traffic includes measurement values of process quantities that are used as feedback in control loops. But the urgency with which updates of these process quantities are needed differs among process quantities. In another particularly advantageous embodiment, at least one data stream with measurement values of a first process quantity is classified as a non-negotiable data stream. At the same time, at least one data stream with measurement values of a second process quantity is classified as a scalable data stream. During execution of the process, the first process quantity varies on a faster time scale than the second process quantity. By possibly introducing delays into the updating of the measurement values of the second process quantity, some error may result. But if the second process quantity is varying slowly, this error is small.

As an illustrative example, consider an industrial process that under normal circumstances uses the following data streams: a process critical video data stream; a first video data stream that is less essential for the running of the process than the process critical video data stream; a second video data stream that is also less essential for the running of the process than the process critical video data stream; asset management traffic; network control traffic; and process control traffic.

One possible strategy to compile an ordered list of actions to be taken to curtail and/or stop data streams is "scale before fail". That is, before the first data stream is completely stopped, all possibilities to scale down the bandwidth requirements of data streams that do not result in complete failures of these data streams are exhausted first. For example, first, the first video data stream (or the second video data stream) is progressively scaled down from UHD resolution to FHD resolution and then to SD resolution; next, the second video data stream (respectively the first video data stream) is progressively scaled down in the same manner; next, the bandwidth requirements of the process critical video data stream, the asset management traffic, the network control traffic, and process control traffic are reduced in that order; and finally, the first (or second) video data stream, the second (respectively first) video data stream, the process critical video data stream, the asset management traffic, and the network control traffic are stopped in that order. The process control traffic may then remain as the only service that is never stopped completely.

The mentioned order in this example does not imply that the process will run unimpeded, or continue to run at all, up to the point where only the process control traffic remains available in reduced form. Rather, there may be one or more points where the further curtailing or even stopping of a particular data stream may cause the quality of the execution of the process to suffer, or may even cause the process to come to a stop. That is, a "graceful degradation" may not be available for all data streams. For example, if the quality of the process critical video is degraded or stopped, the product quality cannot be monitored adequately anymore and will suffer; if the network control traffic is degraded, this will cause a degradation of the network services that the process is relying upon (e.g., TSN guarantees may no longer be met); and if process control traffic is degraded, only rudimentary control of the process equipment remains possible, but it is no longer possible to run the process in an optimal manner.

But it still makes a difference in which order the failures occur. For example, to the extent that control of process equipment is still possible, it may be steered into a safe state in order to protect it from damage.

Modifications of the "scale before fail" strategy are also possible. For example, one of the first video data stream and the second video data stream may be stopped before the other is curtailed to SD resolution.

In one particularly advantageous embodiment, the first process quantity is a pressure, and the second process quantity is a temperature. Changes in temperature are usually dampened by some thermal mass of equipment, or of the contents of such equipment (such as process educts or products). But there is no such thing as a "pressure mass" that slows down changes of pressure with some inertia. Therefore, a pressure in a vessel may change much quicker than a temperature. Moreover, there are particular physical processes which lead to a very rapid increase in pressure, such as the boiling of a substance into vapor that increases the volume of the same amount of substance by a factor of 1,000 or more.

In a further advantageous embodiment, the determining of the ordered list of data streams to be curtailed or stopped is negotiated between multiple entities in a consensus manner, and the result of this negotiation is provided to the network management entity. In this manner, the optimal solution how to cope with a bandwidth shortage may be worked out de-centrally, somewhat akin to the automatic configuration of a wireless mesh network based on negotiations between mesh nodes.

The network management entity may be any entity that is empowered to allocate network resources to data streams. For example, in a 5G network, a 5G Network Exposure Interface may be used as the entity to which the ordered list is provided. In another example, the network management entity may be a controller of a software defined network, SDN. In a SDN, the very architecture of the network may be changed in order to prioritize data streams between certain end points in the network.

The method may be wholly or partially computer-implemented. The invention therefore also relates to one or more computer programs with machine-readable instructions that, when executed on one or more computers and/or compute instances, cause the one or more computers to perform the method described above. In this context, a virtualization platform, a hardware controller, network infrastructure devices (such as switches, bridges, routers or wireless access points), as well as end devices in the network (such as sensors, actuators or other industrial field devices) that are able to execute machine readable instructions are to be regarded as computers as well.

The invention therefore also relates to a non-transitory storage medium, and/or to a download product, with the one or more computer programs. A download product is a product that may be sold in an online shop for immediate fulfillment by download. The invention also provides one or more computers and/or compute instances with the one or more computer programs, and/or with the one or more non-transitory machine-readable storage media and/or download products.

LIST OF REFERENCE SIGNS 1 communications network
1a network management entity in communications network 1
21-23 applications
31-36 data streams transmitted by applications 21-23
31a-36a importances of data streams 31-36
31b-36b network capacity (e.g. bandwidth) requirements of data streams 31-36
4 ordered list of data streams 31-36 to be curtailed or stopped
5 ordered list of data streams 31-36 to be un-curtailed or re-started 6 industrial plant
6a plant management entity
100 method for orchestrating use of communications network 1
110 attributing importances 31a-36a to data streams 31-36
111 classifying data streams 31-36 into particular categories
112 determining importances 31a-36a based on plant 6 knowledge
113 choosing data streams 31-36 with process quantity measurement values
113a classifying first process quantity data stream 31-36 as "non-negotiable"
113b classifying second process quantity data stream 31-36 as "scalable"
120 determining ordered list 4
121 extending transmission interval of measurement values
130 determining ordered list 5
140 providing ordered lists 4, 5 to management entity 1a
141 providing negotiation result to management entity 1a All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for orchestrating the use of at least one communications network for conveying a plurality of data streams transmitted by a plurality of applications, the method comprising:
    attributing to individual data streams, and/or to groups of data streams, levels of importance, wherein the applications transmitting the data streams participate in operation of an industrial plant;
    determining, based at least in part on the levels of importance and on network capacity requirements of the data streams, an ordered list of data streams to be curtailed or stopped in case of a shortage of bandwidth in the communications network; and
    providing the ordered list to a network management entity that is configured to:
        monitor the available bandwidth in the communications network;
        compare the available bandwidth to a combined bandwidth requirement of all data streams currently being transmitted; and
        in response to determining that the available bandwidth is, or is imminent to become, less than the combined bandwidth requirement, curtail or stop data streams in the order given by the list so as to bring the combined bandwidth requirement back to or below the available bandwidth, wherein in at least one data stream of the data streams comprises a critical video stream that is, at least in a degraded form, required for continuing operation of the plant, wherein the critical video stream is a live video stream that monitors the execution of a process or is analyzed to assess quality or quality issues of a manufactured product, wherein the at least one data stream comprises measurement values of a process quantity, and the curtailing of this data stream comprises extending an interval at which new measurement values of the process quantity are transmitted, and wherein the process quantity is associated with varied time scales for obtaining associated measurement values.

2. The method of claim 1, wherein the ordered list contains at least a first entry and a second entry affecting a same data stream, the second entry being a later entry than the first entry, wherein the first entry indicates that the data stream is to be curtailed, and wherein the second entry indicates that the data stream is to be curtailed even further or stopped.

3. The method of claim 1, wherein the network management entity is further configured to, in response to determining that the available bandwidth is higher than the combined bandwidth requirement, and when at least one data stream is curtailed or stopped, un-curtail or re-start at least one curtailed or stopped data stream, provided the un-curtailing or re-starting of the at least one curtailed or stopped data stream will not lead to exceeding the available bandwidth.

4. The method of claim 3, further comprising determining, based at least in part on the levels of importance and on network capacity requirements of the data streams, a second ordered list of data streams indicating an order in which data streams are to be un-curtailed or re-started.

5. The method of claim 1, wherein the curtailing or stopping of at least one data stream comprises one or more of:

deallocating resources intended for use by the data stream;

instructing a source of the data stream to curtail bandwidth usage of the data stream, or to stop the data stream;

instructing at least one network infrastructure device to throttle bandwidth usage of the data stream, or to block forwarding of the data stream; and instructing at least one network infrastructure device to compress and/or transcode the data stream.

6. The method of claim 1, wherein the attributing of importances to data streams comprises classifying at least one data stream, as at least one of:

a non-negotiable data stream that is not to be curtailed or stopped;

a scalable data stream that may be curtailed up to a given extent; or a best-effort data stream that may be stopped.

7. The method of claim 1, wherein the levels of importance are attributed to data streams and/or groups of data streams based at least in part on the importance of these data streams for the operation of the industrial plant.

8. The method of claim 7, wherein at least one data stream with measurement values of a first process quantity is classified as a non-negotiable data stream, wherein at least one data stream with measurement values of a second process quantity is classified as a scalable data stream; and wherein during execution of the process, the first process quantity varies on a faster time scale than the second process quantity.

9. The method of claim 8, wherein the first process quantity is a pressure, and the second process quantity is a temperature.

10. The method of claim 1, wherein the applications transmitting the data streams participate in an execution of the process, and the levels of importance are attributed to data streams and/or groups of data streams based at least in part on the importance of these data streams for the execution of the process.

11. The method of claim 1, wherein the critical video data stream is classified either as a non-negotiable data stream or as a scalable data stream.

12. The method of claim 1, wherein the determining of the ordered list of data streams to be curtailed or stopped is negotiated between multiple entities in a consensus manner, and the result of this negotiation is provided to the network management entity.

13. The method of claim 1, wherein the network management entity is a software defined network, SDN, controller or a 5G Network Exposure Interface.

* * * * *